(12) United States Patent
Huang et al.

(10) Patent No.: US 11,650,680 B2
(45) Date of Patent: May 16, 2023

(54) TOUCH PAD STRUCTURE

(71) Applicant: Acer Incorporated, New Taipei (TW)

(72) Inventors: Yu-Chin Huang, New Taipei (TW); Cheng-Mao Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/412,283

(22) Filed: Aug. 26, 2021

(65) Prior Publication Data
US 2022/0197413 A1   Jun. 23, 2022

(30) Foreign Application Priority Data
Dec. 22, 2020 (TW) .................................. 109145559

(51) Int. Cl.
*G06F 3/041* (2006.01)
*G06F 1/16* (2006.01)

(52) U.S. Cl.
CPC .............. *G06F 3/041* (2013.01); *G06F 1/169* (2013.01)

(58) Field of Classification Search
CPC ....... G06F 3/041; G06F 1/169; G06F 3/03547
See application file for complete search history.

(56) References Cited

U.S. PATENT DOCUMENTS

| 2012/0103773 A1* | 5/2012 | Villain | G06F 3/03547 200/344 |
| 2015/0185769 A1* | 7/2015 | Takata | G06F 1/169 345/173 |

\* cited by examiner

*Primary Examiner* — Adam R. Giesy
(74) *Attorney, Agent, or Firm* — JCIPRNET

(57) ABSTRACT

A touch pad structure includes a base, a guiding component rotatably disposed on the base, a touch pad disposed above the base, and a switch. The guiding component is located between the base and the touch pad. The touch pad has an inner surface facing the base. Here, the switch is disposed on the inner surface, and a guiding structure is disposed on the inner surface. The guiding structure is slidably connected to the guiding component. The touch pad moving toward the base drives the guiding component to rotate relative to the base through the guiding structure, and the touch pad moves along a vertical direction.

9 Claims, 9 Drawing Sheets

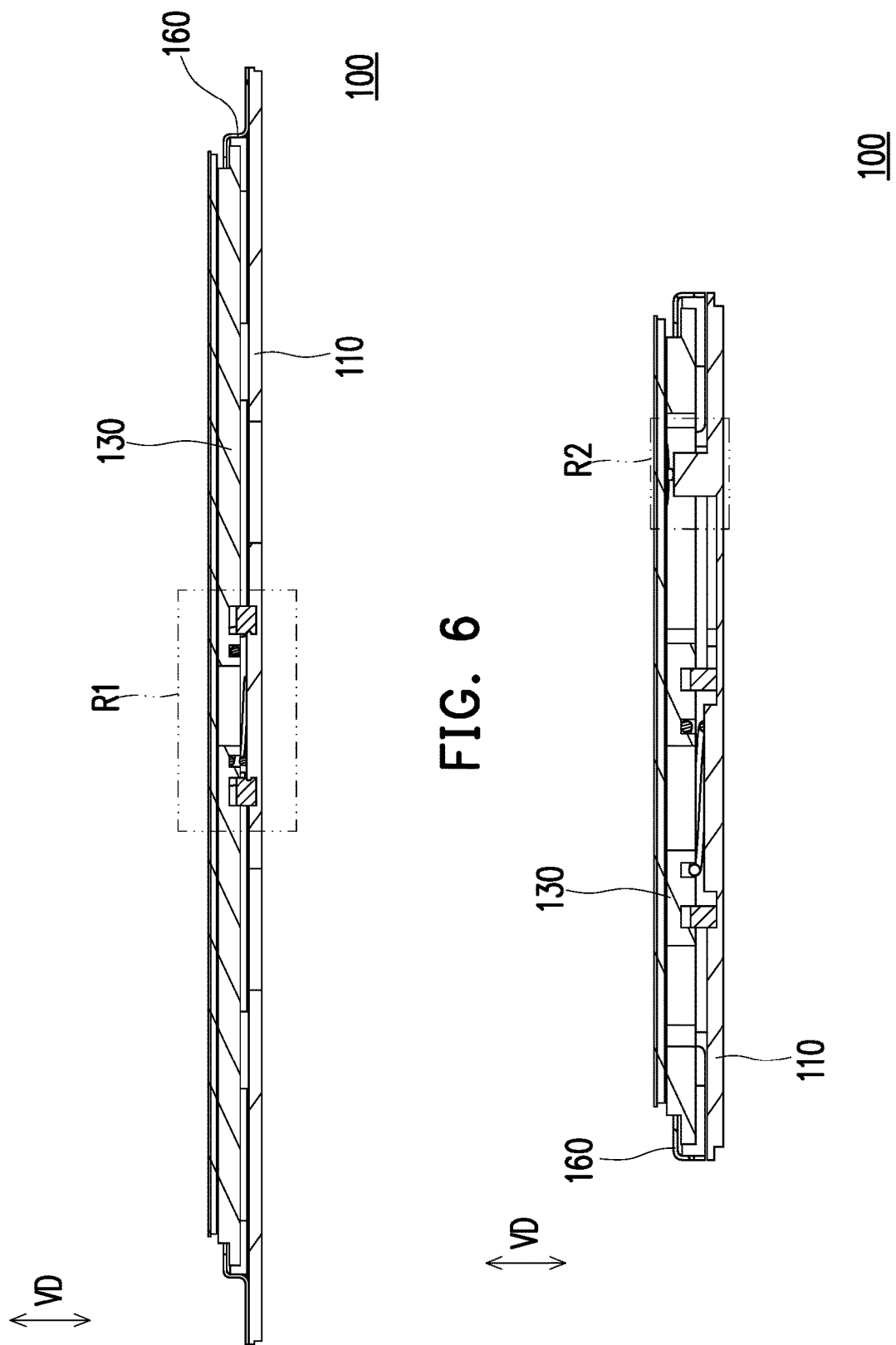

TOUCH PAD STRUCTURE

CROSS-REFERENCE TO RELATED APPLICATION

This application claims the priority benefit of Taiwan patent application serial no. 109145559, filed on Dec. 22, 2020. The entirety of the above-mentioned patent application is hereby incorporated by reference here and made a part of this specification.

BACKGROUND

Technical Field

The disclosure relates to a touch pad structure and particularly relates to a touch pad structure applied to a notebook computer.

Description of Related Art

Notebook computers have become an indispensable tool for modern people in lives or work because of the characteristics of high computation performance, capabilities of multiplexing processing, and portability. Generally, a notebook computer includes a first body and a second body pivotally connected to the first body. The first body is a host capable of performing logical calculations and data access operations, and the second body is a display capable of displaying images. In order for a user to easily use the notebook computer or input information, the first body in most cases is equipped with a keyboard and a touch pad, and the user may move the cursor, select application programs, scroll web pages or documents, and zoom web pages or documents through the touch pad.

As far as the existing design of the conventional touch pad is concerned, the touch pad includes a fulcrum end and a movable end opposite to the fulcrum end, wherein the fulcrum end is connected to the first body, and a switch (such as a dome switch) is disposed at the movable end. When the user taps the touch pad with his or her fingers, the movable end swings in a downward manner relative to the fulcrum end and moves toward a boss, so that the boss touches and triggers the switch. Based on the principle of leverage, it can be known that the point where a force is exerted on the touch pad is overly close to the fulcrum end, the movable end cannot be easily driven to swing in a downward manner relative to the fulcrum end. Thereby, the boss may fail to touch and trigger the switch, which is rather inconvenient for the user's operation.

SUMMARY

The disclosure provides a touch pad structure which may be operated with ease.

In an embodiment of the disclosure, a touch pad structure which includes a base, a guiding component rotatably disposed on the base, a touch pad disposed above the base, and a switch is provided. The guiding component is located between the base and the touch pad. The touch pad has an inner surface facing the base, wherein the switch is disposed on the inner surface, and a guiding structure is disposed on the inner surface. The guiding structure is slidably connected to the guiding component. The touch pad moving toward the base drives the guiding component to rotate relative to the base through the guiding structure, and the touch pad moves along a vertical direction.

In light of the foregoing, the touch pad structure provided in one or more embodiments of the disclosure adopts a vertical oriented design. No matter where a force is exerted by the user on the touch pad, the touch pad may move downward along the vertical direction to trigger the switch, so that the touch pad provided in one or more embodiments of the disclosure may be operated with ease.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 and FIG. 7 are schematic cross-sectional views of the touch pad structure depicted in FIG. 1 with two different cross-sections.

DESCRIPTION OF THE EMBODIMENTS

Figure 1:
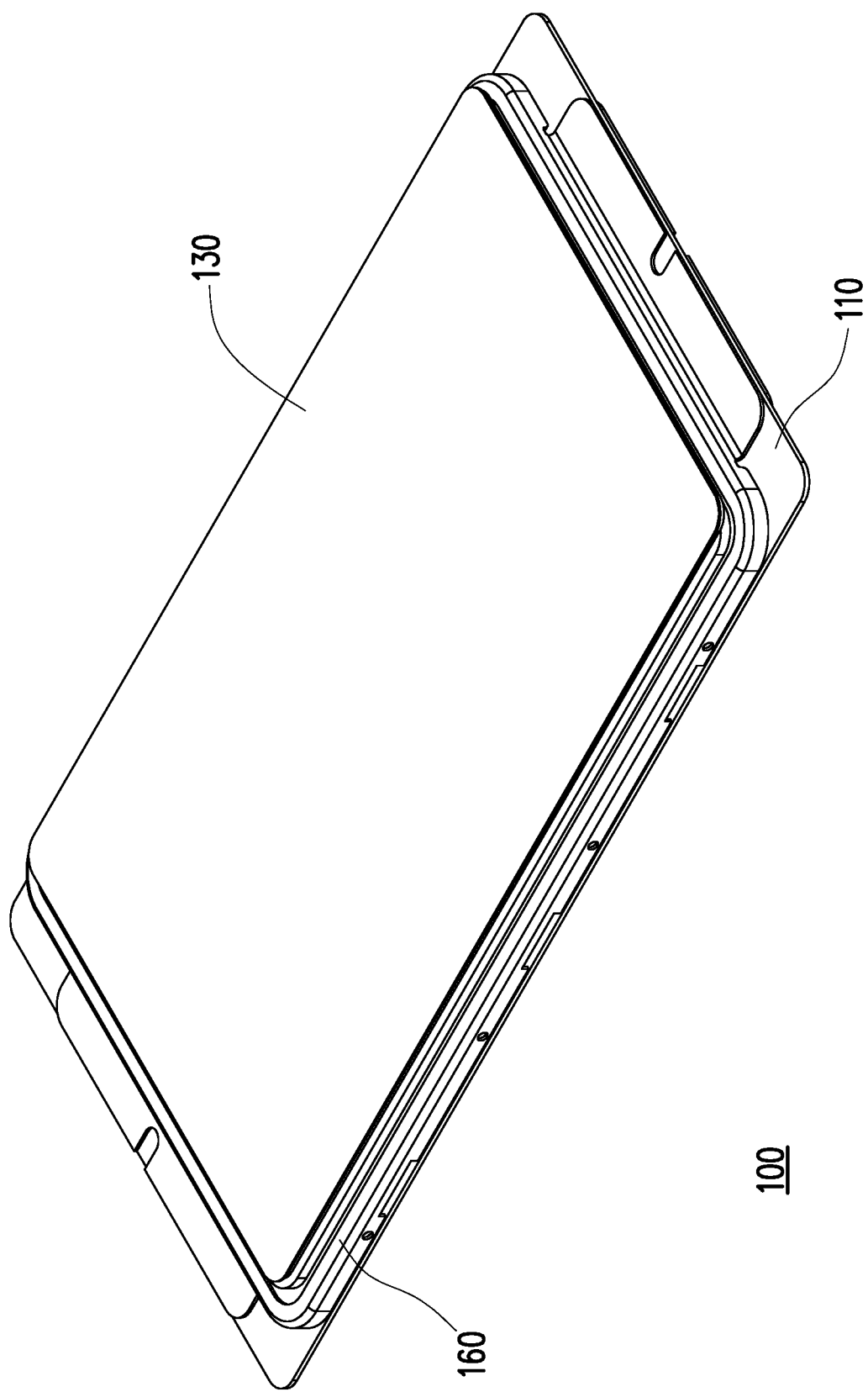
FIG. 1 is a schematic view of a touch pad structure according to an embodiment of the disclosure.

With reference to FIG. 1, in the embodiment, a touch pad structure 100 may be disposed at a host of a notebook computer for a user to move a cursor, select application programs, scroll web pages or documents, zoom the web pages or the documents, or perform other tasks. As shown in FIG. 2, FIG. 3, FIG. 6, and FIG. 8, the touch pad structure 100 includes a base 110, a guiding component 120 rotatably disposed at the base 110, a touch pad 130, and a switch 140, and the guiding component 120 is located between the base 110 and the touch pad 130. On the other hand, the touch pad 130 has an inner surface 131 facing the base 110, wherein the switch 140 is disposed on the inner surface 131 and is located between the base 110 and the touch pad 130.

Figure 4:
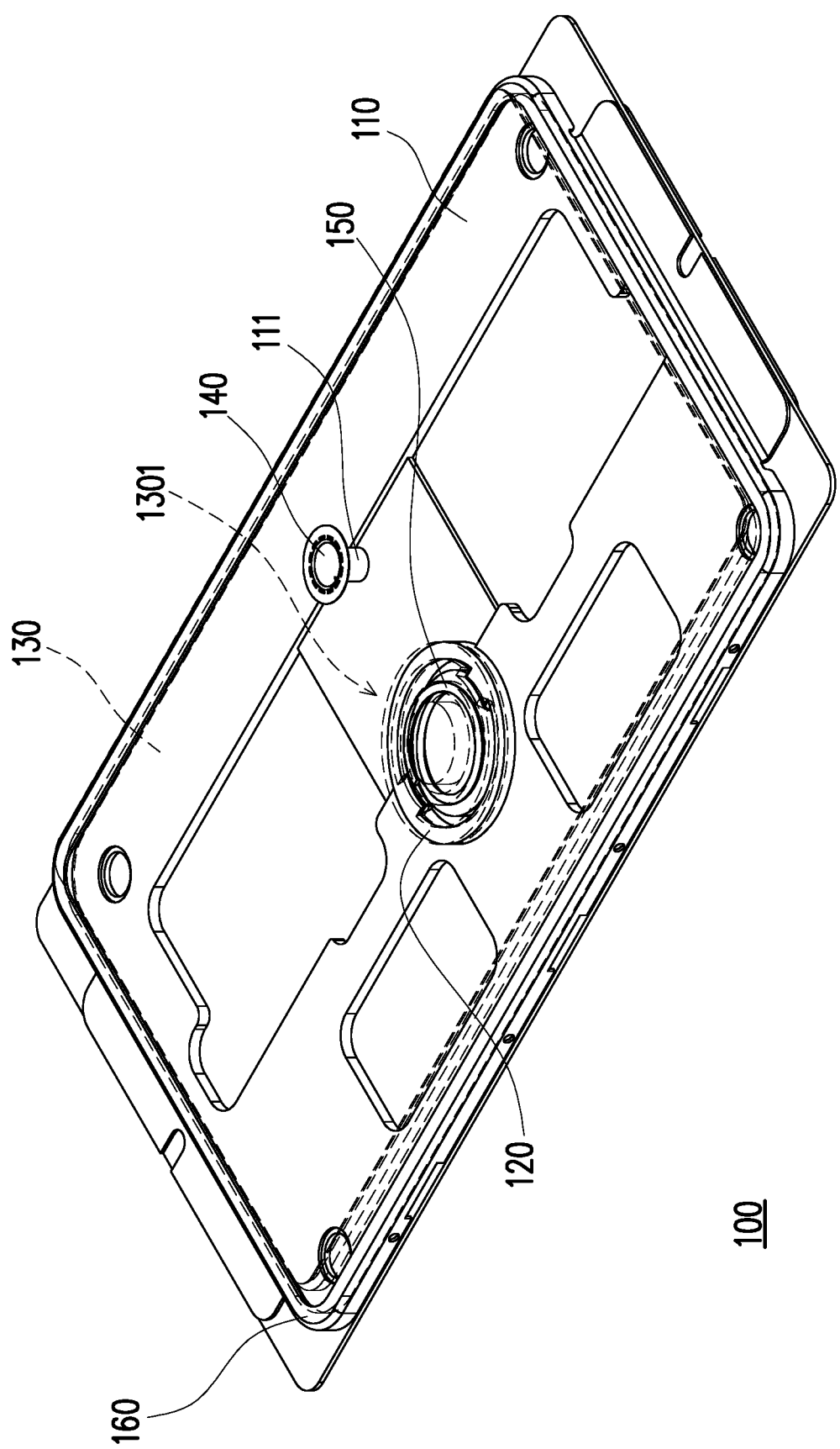
FIG. 4 is a schematic partial perspective view of the touch pad structure depicted in FIG. 1.
Figure 10:
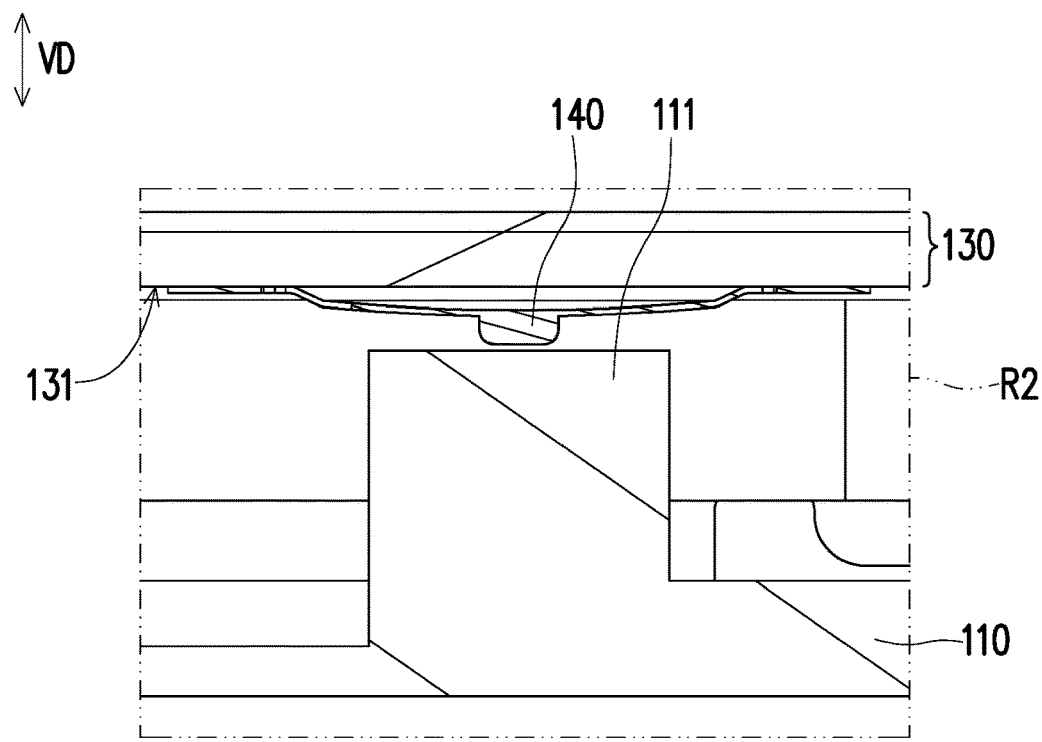
FIG. 10 and FIG. 11 are schematic enlarged views of a region R2 depicted in FIG. 7 in two different states.
Figure 11:
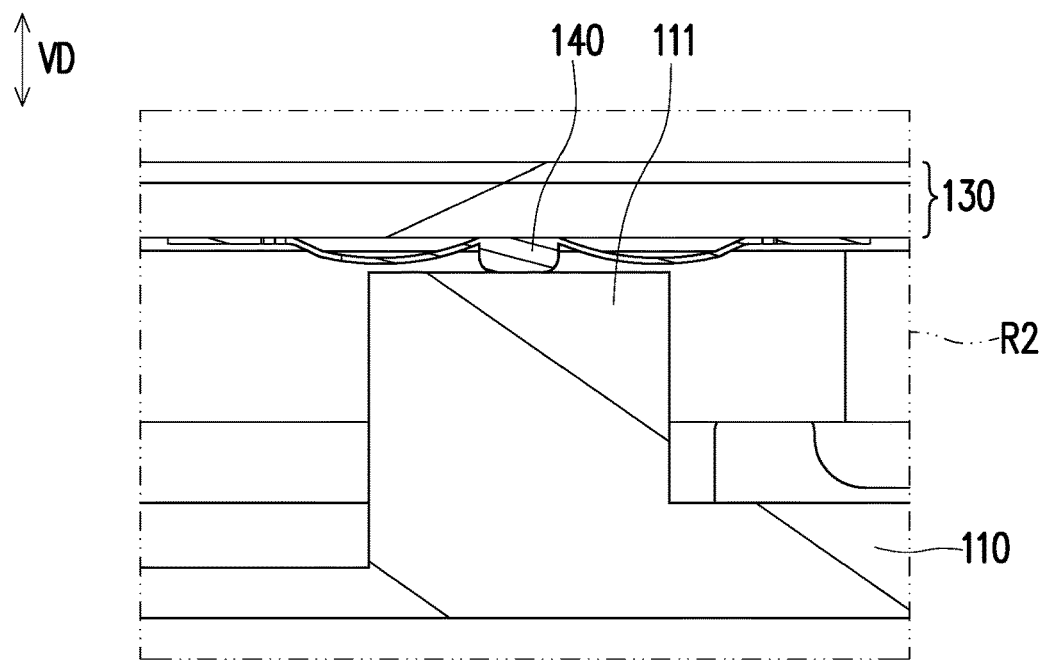

As shown in FIG. 4, FIG. 7, and FIG. 10, the switch 140 may be a dome switch, wherein the base 110 has a triggering boss 111 protruding toward the inner surface 131 of the touch pad 130, and the triggering boss 111 is aligned to the switch 140. When a user exerts a force to the touch pad 130, the switch 140 moves with the touch pad 130 and moves toward the triggering boss 111, so that the triggering boss 111 contacts and triggers the switch 140, as shown in FIG. 10 and FIG. 11.

Figure 5:
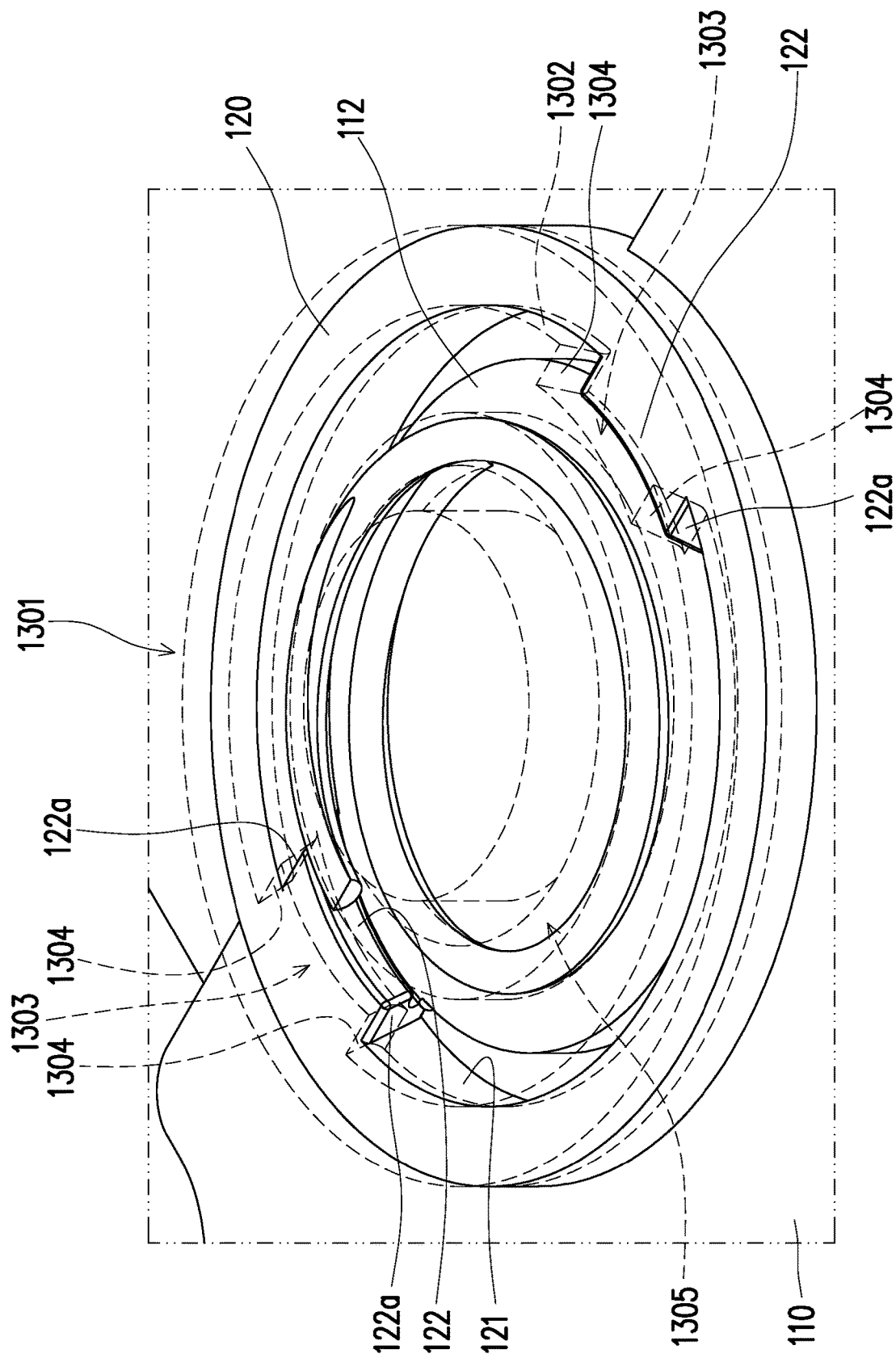
FIG. 5 is a schematic partial enlarged view of FIG. 4.
Figure 8:
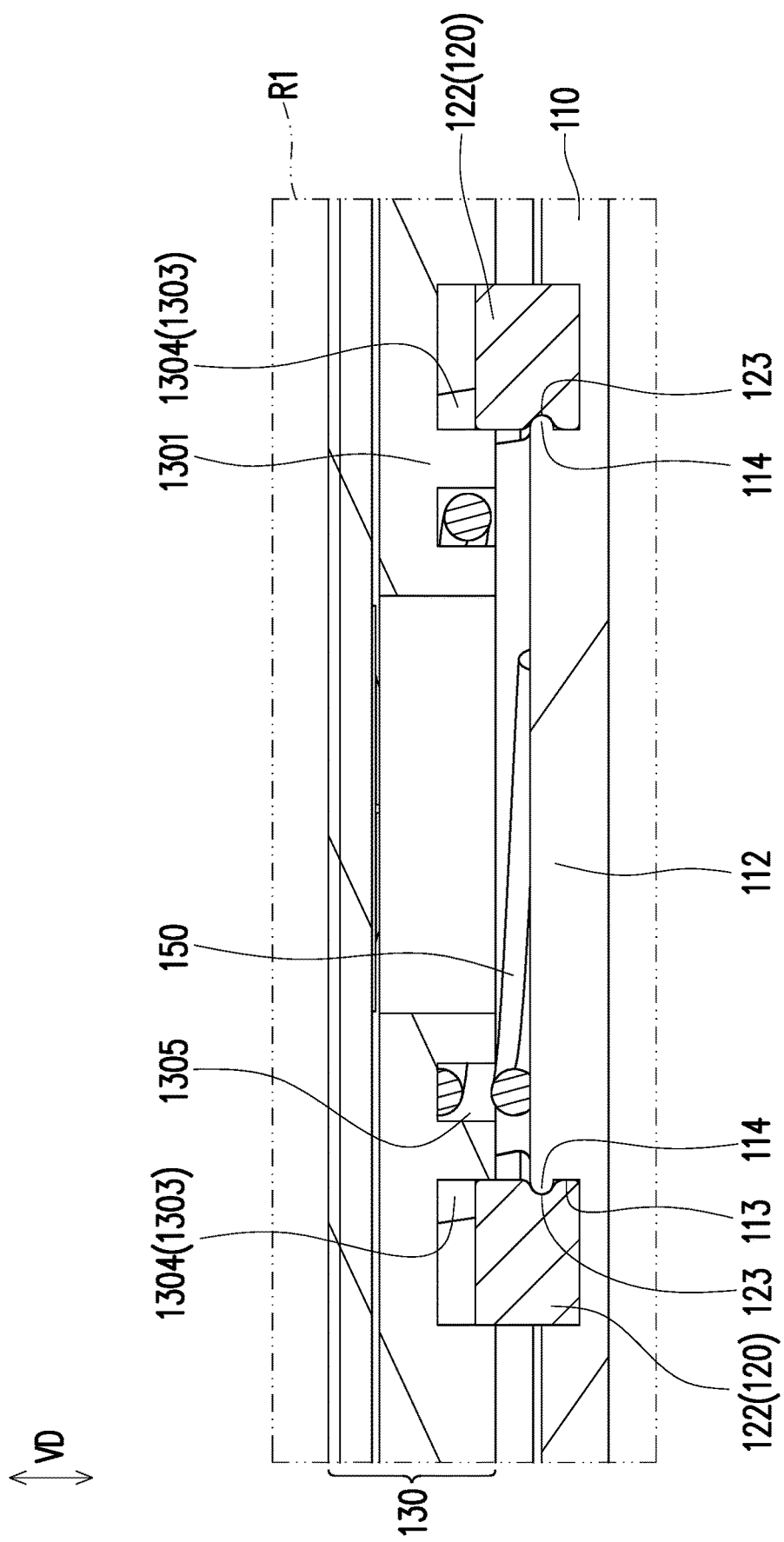
FIG. 8 and FIG. 9 are schematic enlarged views of a region R1 depicted in FIG. 6 in two different states.
Figure 9:
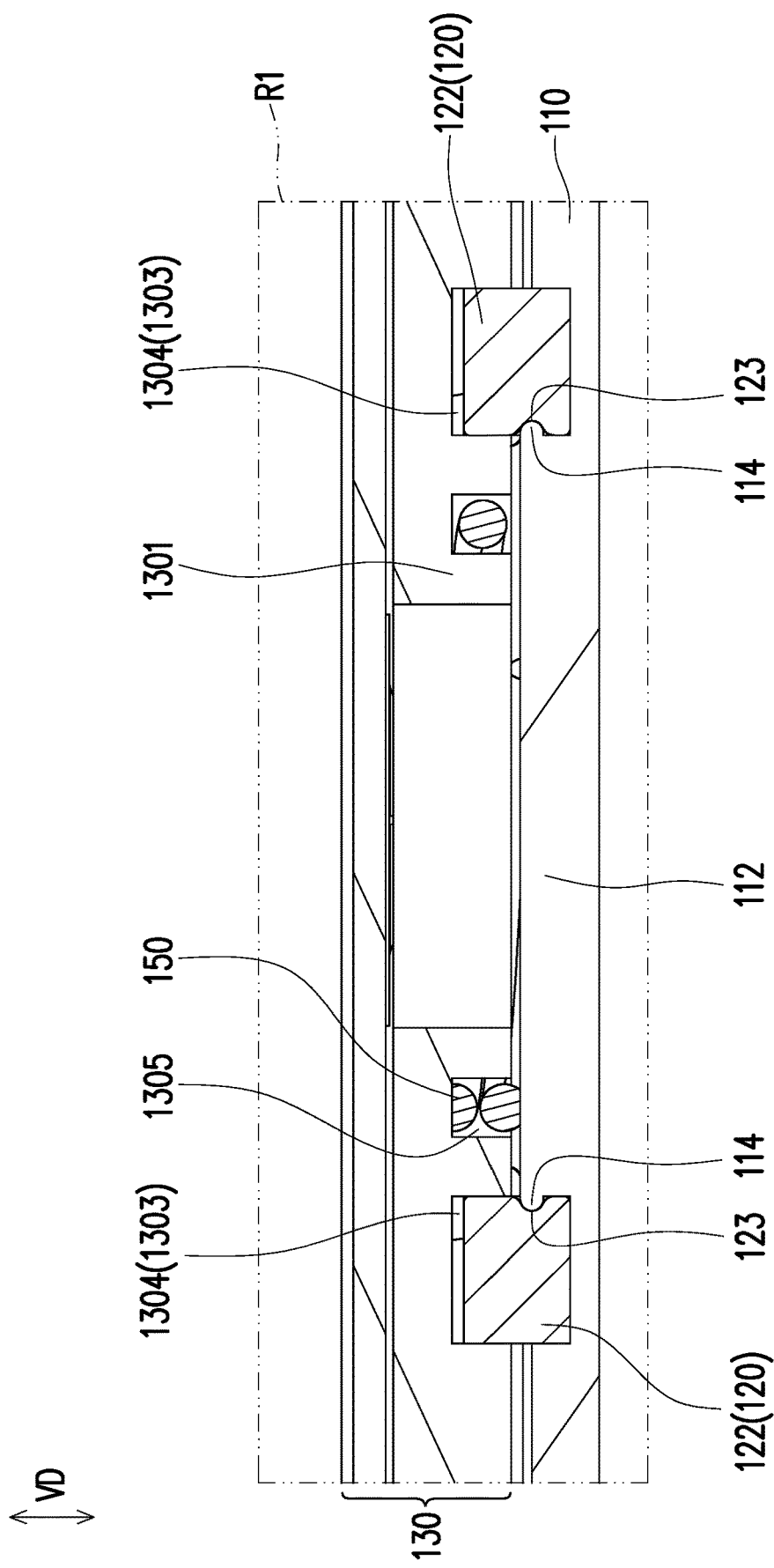

With reference to FIG. 2 to FIG. 5, in the embodiment, the touch pad 130 includes a guiding structure 1301 disposed on the inner surface 131, wherein the guiding component 120, corresponding to the guiding structure 1301, is disposed on the base 110 and slidably connected to the guiding structure 1301. As shown in FIG. 5, FIG. 8, and FIG. 9, when the user exerts the force to the touch pad 130, the touch pad 130 moving toward the base 110 drives the guiding component 120 to rotate relative to the base 110 through the guiding structure 1301, and the touch pad 130 moves along a vertical direction VD. At the same time, the guiding component 120 slides relative to the guiding structure 1301.

As shown in FIG. 5 and FIG. 8 to FIG. 11, the guiding component 120 and the guiding structure 1301 are part of the vertical oriented design. Through the cooperation of the guiding component 120 and the guiding structure 1301, no matter where the force is exerted by the user on touch pad 130, the touch pad 130 may move downward along the vertical direction VD to trigger the switch 140. Accordingly, the touch pad structure 100 may be operated with ease.

With reference to FIG. 2, FIG. 3, FIG. 5, and FIG. 8, the guiding component 120 may be a guiding ring and surround the guiding structure 1301. The guiding component 120 has a first guiding surface 121 facing the guiding structure 1301 and a spiral convex portion 122 protruding from the first guiding surface 121; that is, the spiral convex portion 122 protrudes toward the guiding structure 1301. On the other hand, the guiding structure 1301 has a second guiding surface 1302 facing the first guiding surface 121 and a spiral concave portion 1303 indented from the second guiding surface 1302, wherein the geometric contour of the spiral convex portion 122 matches or complements the geometric contour of the spiral concave portion 1303, and the spiral convex portion 122 is slidably disposed in the spiral concave portion 1303. Since the spiral concave portion 1303 and the spiral convex portion 122 are matched in a rotational orientation, when the guiding structure 1301 moves toward the base 110, the spiral concave portion 1303 pushes the spiral convex portion 122 to drive the guiding component 120 to rotate relative to the base 110 and slide relative to the guiding structure 1301.

For instance, the first guiding surface 121 may be an arc-shaped concave surface, and the second guiding surface 1302 may be an arc-shaped convex surface that matches or complements the first guiding surface 121. On the other hand, the number of the spiral convex portions 122 is equal to the number of the spiral concave portions 1303, and the spiral convex portions 122 and the spiral concave portions 1303 are the same in number. The number of the spiral convex portions 122 may be plural, and the spiral convex portions 122 are evenly distributed on the first guiding surface 121. The number of the spiral concave portions 1303 may be plural, and the spiral concave portions 1303 are evenly distributed on the second guiding surface 1302. Therefore, when the guiding structure 1301 moves toward or away from the base 110, the spiral concave portion 1303 may evenly exert an action force to the guiding component 120.

In detail, the spiral convex portion 122 has two opposite first guiding inclined surfaces 122a, and the spiral concave portion 1303 has two opposite second guiding inclined surfaces 1304. The two first guiding inclined surfaces 122a are located between the two second guiding inclined surfaces 1304 and respectively contact the two second guiding inclined surfaces 1304. When the guiding component 120 rotates relative to the base 110, each first guiding inclined surface 122a slides relative to the corresponding second guiding inclined surface 1304.

Figure 2:
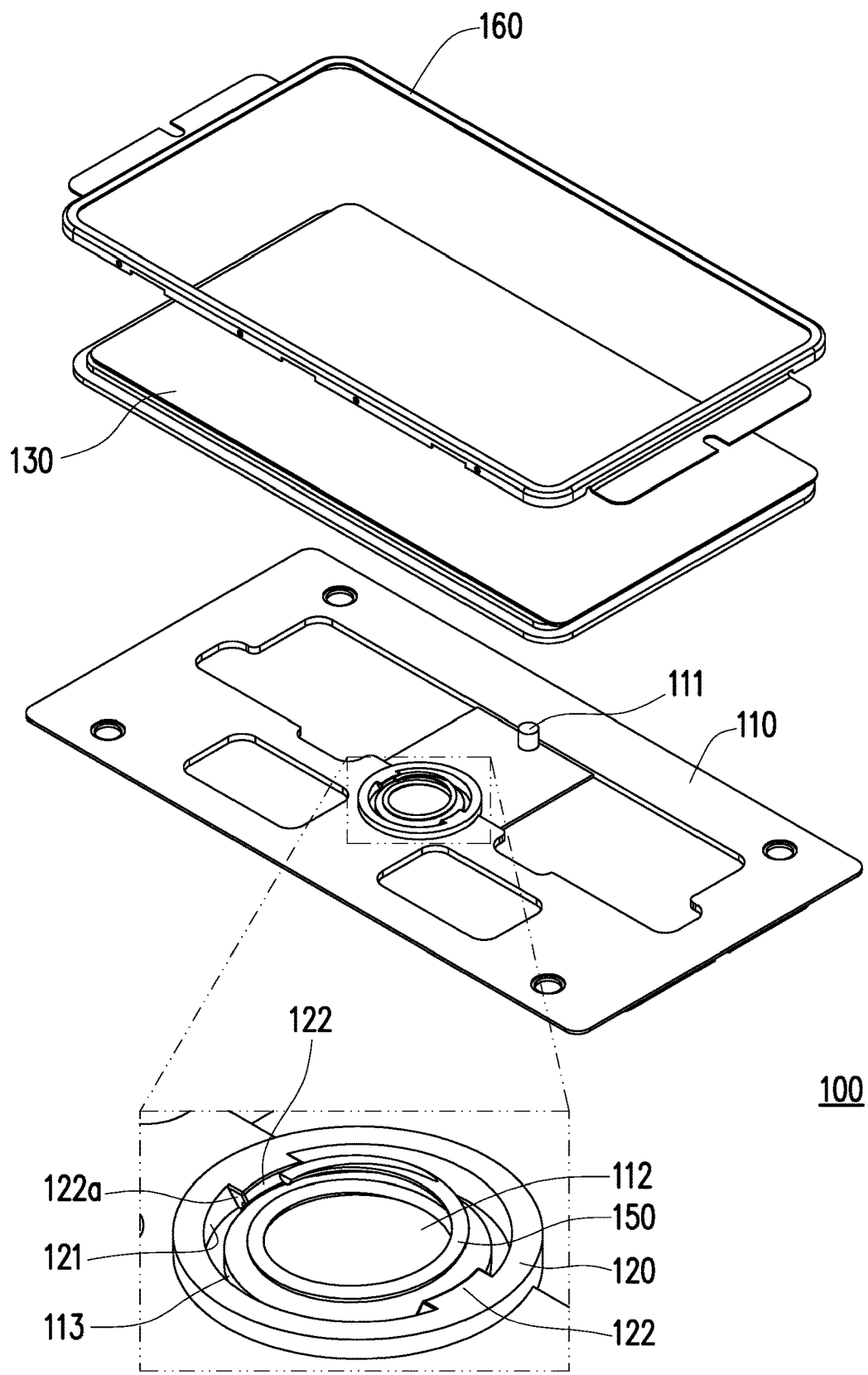
FIG. 2 and FIG. 3 are schematic exploded views of the touch pad structure depicted in FIG. 1 at two different viewing angles.

With reference to FIG. 2, FIG. 5, and FIG. 8, in the embodiment, the base 110 has a guiding boss 112 protruding toward the touch pad 130, wherein the guiding component 120 surrounds the guiding boss 112 and is coupled to the guiding boss 112. Therefore, the guiding boss 112 may serve to position the guiding component 120 and prevent the guiding component 120 from arbitrarily sliding on the base 110. Specifically, the first guiding surface 121 of the guiding component 120 faces the guiding boss 112, and the guiding boss 112 has a third guiding surface 113 facing the first guiding surface 121 and a guiding convex rib 114 protruding from the third guiding surface 113. The guiding convex rib 114 protrudes toward the spiral convex portion 122, wherein the spiral convex portion 122 has a guiding groove 123 facing the third guiding surface 113, and the guiding convex rib 114 is slidably disposed in the guiding groove 123.

When the guiding component 120 rotates relative to the base 110, the guiding component 120 rotates relative to the guiding boss 112. The structural cooperation of the guiding convex rib 114 and the guiding groove 123 is conducive to the improvement of the rotational stability of the guiding component 120.

For instance, the first guiding surface 121 may be an arc-shaped concave surface, and the third guiding surface 113 may be an arc-shaped convex surface that matches or complements the first guiding surface 121. On the other hand, the guiding convex rib 114 may be an arc-shaped convex rib, and the guiding groove 123 may be an arc-shaped groove that matches or complements the guiding convex rib 114. In addition, the number of the spiral convex portions 122 is equal to the number of the guiding convex ribs 114, and the spiral convex portions 122 and the guiding convex ribs 114 are the same in number. The number of the spiral convex portions 122 may be plural, and the spiral convex portions 122 are evenly distributed on the first guiding surface 121. The number of the guiding convex ribs 114 may be plural, and the guiding convex ribs 114 are evenly distributed on the third guiding surface 113. The structural cooperation of the guiding convex ribs 114 and the guiding grooves 123 of the spiral convex portions 122 is conducive to the improvement of the rotational stability of the guiding component 120.

With reference to FIG. 2, FIG. 5, FIG. 8, and FIG. 9, in the embodiment, the touch pad structure 100 further includes a spring 150, wherein the spring 150 is disposed between the touch pad 130 and the base 110 and may be a compressed spring. When the touch pad 130 moves toward the base 110, the spring 150 is squeezed and elastically deformed. Once the downward pressure exerted to the touch pad 130 is removed, the elastic restoration force of the spring 150 may drive the touch pad 130 to move upward along the vertical direction VD and return to the initial position. At the same time, the guiding component 120 is driven by the guiding structure 1301 to rotate relative to the base 110.

Specifically, when the touch pad 130 moves toward the base 110, the guiding component 120 rotates in a first direction. When the touch pad 130 moves away from the base 110, the guiding component 120 rotates in a second direction opposite to the first direction.

Figure 3:
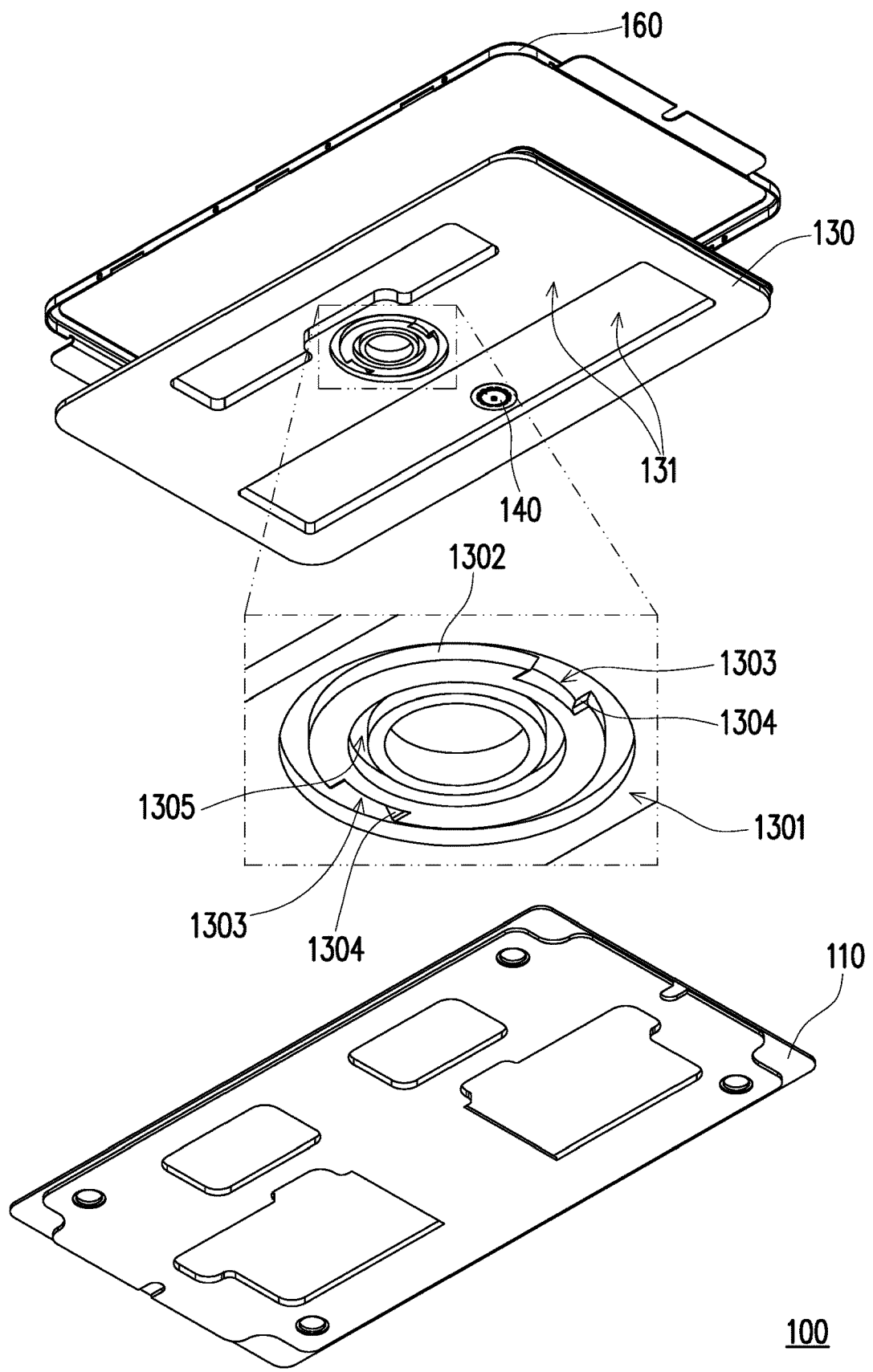

As shown in FIG. 2, FIG. 3, and FIG. 8, the guiding component 120 surrounds the spring 150, wherein both ends of the spring 150 contact the guiding boss 112 and the touch pad 130, respectively. To be more specific, the guiding structure 1301 has a ring-shaped groove 1305 facing the base 110, and one end of the spring 150 is disposed in the ring-shaped groove 1305 to prevent the spring 150 from shifting when it is stretched and deformed.

With reference to FIG. 1, FIG. 6, and FIG. 7, the touch pad structure 100 further includes a position-limiting frame 160 which is fixed to the base 110 and surrounds the touch pad 130. Therefore, the position-limiting frame 160 may also act as a part of the vertical oriented design to ensure that the touch pad 130 moves up and down along the vertical direction VD. For instance, the vertical direction VD is perpendicular to an operation surface of the touch pad 130 touched by the user's fingers.

To sum up, the touch pad structure provided in one or more embodiments of the disclosure adopts the vertical oriented design. No matter where a force is exerted by the user on the touch pad, the touch pad may move downward along the vertical direction to trigger the switch, so that the touch pad provided in one or more embodiments of the disclosure may be operated with ease. On the other hand, after the downward pressure exerted to the touch pad is removed, the elastic restoration force of the spring may drive the touch pad to move upward along the vertical direction and return to the initial position.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch pad structure, comprising:
  a base;
  a guiding component, rotatably disposed on the base;
  a touch pad, disposed above the base, the guiding component being located between the base and the touch pad; and
  a switch, wherein the touch pad has an inner surface facing the base, the switch is disposed on the inner surface, a guiding structure is disposed on the inner surface and slidably connected to the guiding component, the touch pad moving toward the base drives the guiding component to rotate relative to the base through the guiding structure, and the touch pad moves along a vertical direction,
  wherein the guiding component surrounds the guiding structure, the guiding component has a first guiding surface facing the guiding structure and a spiral convex portion protruding from the first guiding surface, the guiding structure has a second guiding surface facing the first guiding surface and a spiral concave portion indented from the second guiding surface, and the spiral convex portion is slidably disposed in the spiral concave portion.

2. The touch pad structure according to claim 1, wherein the spiral convex portion has two opposite first guiding inclined surfaces, the spiral concave portion has two opposite second guiding inclined surfaces, and the two first guiding inclined surfaces are located between the two second guiding inclined surfaces and respectively contact the two second guiding inclined surfaces.

3. The touch pad structure according to claim 1, wherein the base has a guiding boss protruding toward the touch pad, the guiding component surrounds the guiding boss, the first guiding surface faces the guiding boss, and the guiding boss has a third guiding surface facing the first guiding surface and a guiding convex rib protruding from the third guiding surface, wherein the spiral convex portion has a guiding groove facing the third guiding surface, and the guiding convex rib is slidably disposed in the guiding groove.

4. The touch pad structure according to claim 3, further comprising a spring, wherein the spring is disposed between the touch pad and the base, and one end of the spring contacts the guiding boss.

5. The touch pad structure according to claim 1, further comprising a position-limiting frame, the position-limiting frame being fixed to the base and surrounding the touch pad.

6. The touch pad structure according to claim 1, wherein the base has a triggering boss protruding toward the touch pad, and the triggering boss is aligned to the switch.

7. The touch pad structure according to claim 1, further comprising a spring, wherein the spring is disposed between the touch pad and the base.

8. The touch pad structure according to claim 7, wherein the guiding component surrounds the spring.

9. The touch pad structure according to claim 7, wherein the guiding structure has a ring-shaped groove facing the base, and one end of the spring is disposed in the ring-shaped groove.

* * * * *